United States Patent [19]

Inoue et al.

[11] Patent Number: 4,899,701
[45] Date of Patent: Feb. 13, 1990

[54] VALVE OPERATION CONTROL DEVICE FOR INTERNAL COMBUSTION ENGINE

[75] Inventors: Kazuo Inoue; Noriyuki Kishi, both of Tokyo, Japan

[73] Assignee: Honda Giken Kogyo Kabushiki Kaisha, Tokyo, Japan

[21] Appl. No.: 247,153

[22] Filed: Sep. 21, 1988

[30] Foreign Application Priority Data

Sep. 22, 1987 [JP] Japan .................. 62-237710

[51] Int. Cl.⁴ ............................................. F01H 1/34
[52] U.S. Cl. ........................... 123/90.16; 123/196 S; 123/198 D
[58] Field of Search ............... 123/90.15, 90.16, 90.55, 123/90.63, 90.46, 196 S, 198 D, 198 F, 90.4, 90.41

[56] References Cited

U.S. PATENT DOCUMENTS

| | | | |
|---|---|---|---|
| 4,483,287 | 11/1984 | Monigold et al. | 123/196 S |
| 4,526,140 | 7/1985 | Monigold et al. | 123/196 S |
| 4,534,323 | 8/1985 | Kato et al. | 123/90.16 |
| 4,535,732 | 8/1985 | Nakano et al. | 123/90.16 |
| 4,648,364 | 3/1987 | Wills | 123/198 D |
| 4,683,854 | 8/1987 | Goulet | 123/478 |
| 4,694,793 | 9/1987 | Kawakita et al. | 123/196 S |
| 4,727,831 | 3/1988 | Nagahiro et al. | 123/90.16 |
| 4,741,306 | 5/1988 | Watanabe et al. | 123/198 DB |
| 4,788,946 | 12/1988 | Inoue et al. | 123/90.16 |
| 4,790,274 | 12/1988 | Inoue et al. | 123/90.44 |

Primary Examiner—Charles J. Myhre
Assistant Examiner—Weilun Lo
Attorney, Agent, or Firm—Lyon & Lyon

[57] ABSTRACT

A valve operating control device for an internal combustion engine having a valve operating mode changing mechanism for switching the opening/closing operation of an intake or exhaust valve between a low-speed operation mode corresponding to a low-speed operation of the engine and a high-speed operation mode corresponding to a high-speed operation of the engine. A control device controls the operation of the valve operation mode changing mechanism according to the rotational speed of the engine for shifting the valve operation mode changing mechanism from the high-speed mode to the low-speed mode where the output torque of the engine is the same in the low- and high-speed operation modes of the valve operation mode changing mechanism and for shifting the valve operation mode changing mechanism from the low-speed operation mode to the high-speed operation mode at a second rotational speed that is higher than the first rotational speed.

5 Claims, 4 Drawing Sheets

VALVE OPERATION CONTROL DEVICE FOR INTERNAL COMBUSTION ENGINE

The present invention relates to a valve operation control device for an internal combustion engine having a valve operation mode changing mechanism for switching the opening/closing operation of an intake or exhaust valve between a low-speed operation mode corresponding to a low-speed operation of the engine and a high-speed operation mode corresponding to a high-speed operation of the engine.

Conventional valve operation control devices of the type described above are known from various prior patents and applications, such as, Japanese Laid-Open Patent Publication No. 61-19911 and U.S. Pat. Nos. 4,537,164, 4,537,165, 4,545,342, 4,535,732, 4,656,977, 4,612,884, 4,576,128, 4,587,936, 4,741,297, 4,727,830, 4,727,831 and 4,726,332.

In the Conventional valve operation control devices, it is general to select an engine rotational speed for shifting the valve operation mode changing mechanism from the low-speed operation mode to the high-speed operation mode, so as to be equal to a rotational speed for shifting the valve operation mode changing mechanism from the high-speed operation mode to the low-speed operation mode. The output torque characteristics of the engine vary in the low- and high-speed operation modes of the valve operation mode changing mechanism. Unless some hysteresis is provided at a crossover point between these low- and high-speed operation modes, the valve operation mode changing mechanism may undergo hunting in operation at such a crossover point. Therefore, it is an indispensable control process to include hysteresis. The operation performance of the engine depends, however, upon where such hysteresis is included in a plurality of output torque characteristics. For acceleration, switching over between the output torque characteristics of the engine should be made in a somewhat higher rotational speed range for better acceleration performance. On the other hand, if there is an output torque shift upon deceleration, a shock is produced by such an output torque shift. Such different demands in acceleration and deceleration cannot be met by the conventional valve operation control devices in which the valve operation mode changing mechanism is switched between the different operation modes at the same rotational speed.

The present invention has been made in view of the aforesaid problems and demands. It is an object of the present invention to provide a valve operation control device for an internal combustion engine, which can improve acceleration performance and achieve smooth switching over between different output torques upon deceleration.

According to the present invention, a rotational speed detector for detecting the rotational speed of the engine is connected to control means, there being set in the control means a first rotational speed, which is substantially equal to a rotational speed at the time the output torque of an engine remains the same in low- and high-speed operation modes of a valve operation mode changing mechanism, for shifting the valve operation mode changing mechanism from the high-speed operation mode to the low-speed operation mode, and a second rotational speed higher than the first rotational speed for shifting the valve operation mode changing mechanism from the low-speed operation mode to the high-speed operation mode.

With the above arrangement, since the valve operation mode changing mechanism is shifted from the low-speed operation mode to the high-speed operation mode at the second rotational speed where there is a torque difference or, in other words, the shift between the output torque of the engine at the time valve operation mode changing mechanism is in the low-speed operation mode and the output torque of the engine at the time the valve operation mode changing mechanism is in the high-speed operation mode the acceleration performance is increased. Inasmuch as the valve operation mode changing mechanism is shifted from the high-speed operation mode to the low-speed operation mode at the first rotational speed which is substantially equal to the rotational speed where the output torque remains the same in the low- and high-speed operation modes, any shock due to an output torque change is not produced, and smooth switching over from the high-speed operation mode to the low-speed operation mode is achieved.

An embodiment of the present invention will hereinafter be described with reference to the drawings, wherein.

Figure 1:
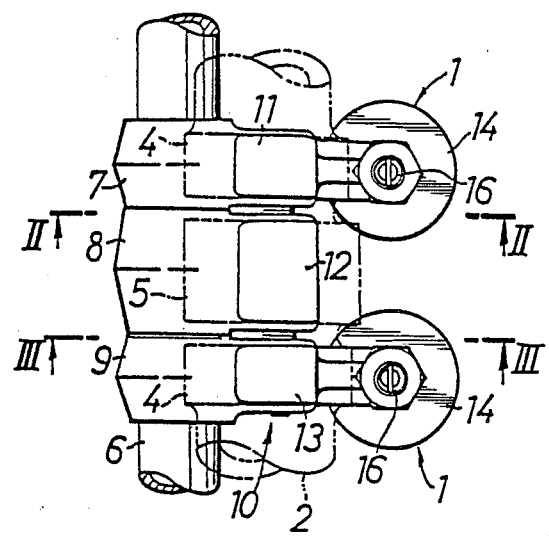
FIG. 1 is a plan view of a valve operating mechanism for two valves of an internal combustion engine.
Figure 3:
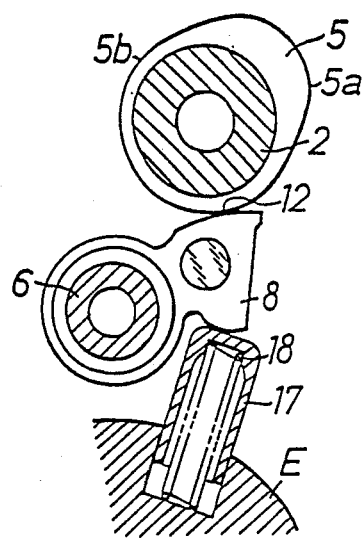
FIG. 3 is a sectional elevation view taken on the line III—III of FIG. 1.
Figure 2:
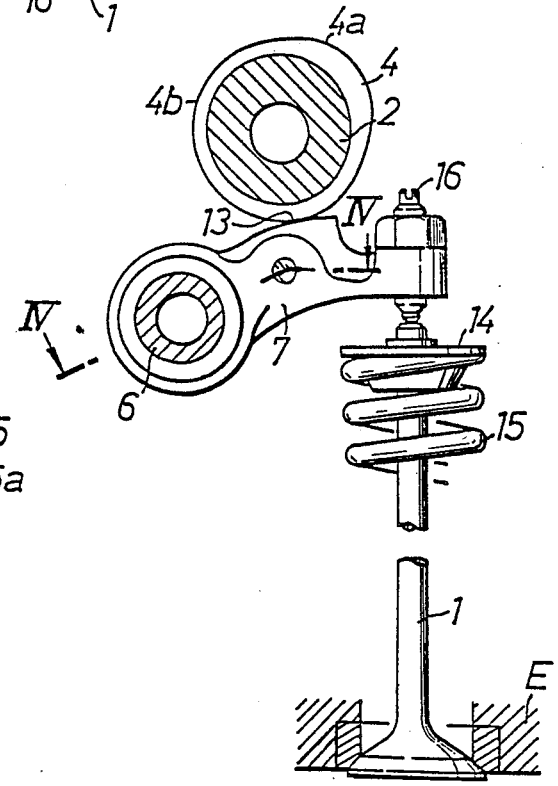
FIG. 2 is a sectional elevation view taken on the line II—II of FIG. 1.

In FIGS. 1, 2 and 3, a pair of intake valves 1 disposed in an engine body E is opened and closed by a pair of low-speed cams 4 or a high-speed cam 5, which cams are integrally formed on a camshaft 2 rotatable by the crankshaft of the engine at a speed ratio of ½ with respect to the speed of rotation of the engine. The valves 1 are operated by first, second, and third rocker arms 7, 8 and 9 that are pivotally supported on a rocker shaft 6 extending parallel to the camshaft 2, and by a valve operation mode changing mechanism 10 for selectively connecting and disconnecting the rocker arms 7, 8, and 9 to change the operation mode of the intake valves 1 according to the operating conditions of the engine.

The camshaft 2 is rotatably disposed above the engine body E. The low-speed cams 4 are integrally formed with the camshaft 2 in alignment with the intake valves 1, respectively. The high-speed cam 5 is integrally formed with the camshaft 2 between the low-speed cams 4. Each of the low-speed cams 4 has a cam lobe 4a projecting radially outwardly to a relatively small extent and a base circle portion 4b. The cam lobes 4a may be different. The high-speed cam 5 has a cam lobe 5a projecting radially outwardly to a relatively large extent and a base circle portion 5b.

The rocker shaft 6 is fixed below the camshaft 2. The first and third rocker arms 7 and 9 are basically of the same configuration and are pivotally supported on the rocker shaft 6 in alignment with the intake valves 1, respectively, and extend to a position above the intake valves 1. The first and third rocker arms 7 and 9 have cam slippers 11 and 13 on their upper surfaces held in slidable contact with the low-speed cams 4, respectively. The second rocker arm 8 is pivotally supported on the rocker shaft 6 between the first and third rocker arms 7 and 9 and has a cam slipper 12 on its upper surface held in slidable contact with the high-speed cam 5.

Flanges 14 are attached to the upper ends of the intake valves 1, respectively. The intake valves 1 are normally urged in a closing direction, i.e., upwardly, by valve springs 15 disposed between the flanges 14 and the engine body E. Tappet screws 16 are adjustably threaded through the first and third rocker arms 7 and 9 to be engageable with the upper ends of the intake valves 1.

A bottomed cylindrical lifter 17 is held against the lower surface of the end of the second rocker arm 8 and is normally urged upwardly by a lifter spring 18 interposed between the lifter 17 and the engine body E to hold the cam slipper 12 of the second rocker arm 8 slidably against the high-speed cam 5 at all times.

Figure 4:
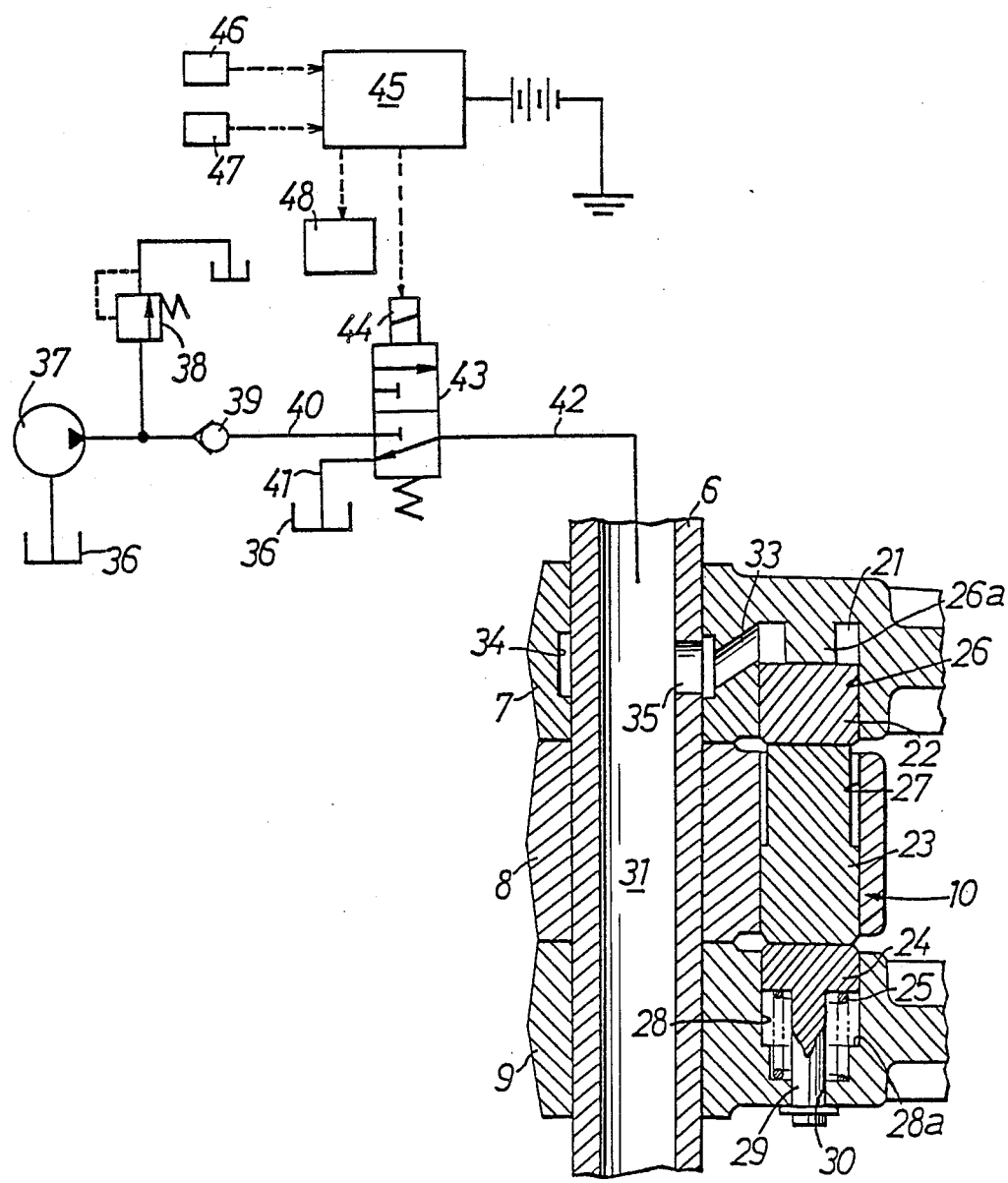
FIG. 4 is a sectional plan view taken on the line IV—IV of FIG. 2 and also shows diagrammatically a hydraulic pressure control system.

As shown in FIG. 4, the valve operation mode changing mechanism 10 comprises a first coupling pin 22 slidably fitted in the first rocker arm 7 and having one end facing into a hydraulic pressure chamber 21, the first coupling pin 22 being movable between a position in which it interconnects the first and second rocker arms 7 and 8 and a position in which it disconnects the first and second rocker arms 7 and 8 from each other, a second coupling pin 23 slidably fitted in the second rocker arm 8 and having one end held coaxially against the other ed of the first coupling pin 22, the second coupling pin 23 being movable between a position in which it interconnects the second and third rocker arms 8 and 9 and a position in which it disconnects the second and third rocker arms 8 and 9 from each other, a stopper pin 24 slidably fitted in the third rocker arm 9 and having one end held coaxially with the other end of the second coupling pin 23, and a return spring 25 disposed under compression between the stopper pin 24 and the third rocker arm 9 for normally urging the pins 22, 23, 24 to disconnect the rocker arms from each other.

The first rocker arm 7 has a first bottomed hole 26 defined therein parallel to the rocker shaft 6 and opening toward the second rocker arm 8. The first coupling pin 22 is slidably fitted in the first hole 26, with the hydraulic chamber 21 being defined between said one end of the first coupling pin 22 and the closed end of the first hole 26. The closed end of the first hole 26 has a limiting projection 26a for abutting against the end of the first coupling pin 22. The first coupling pin 22 has an axial length selected such that when said one end thereof abuts against the limiting projection 26a, the other end of the first coupling pin 22 is positioned between the first and second rocker arms 7 and 8.

The second rocker arm 8 has a guide hole 27 defined therein between its opposite sides and extending parallel to the rocker shaft 6, the guide hole 27 having the same diameter as that of the first hole 26. The second coupling pin 23 is slidably fitted in the guide hole 27. The second coupling pin 23 has an axial length selected such that when its end abutting against the other end of the first coupling pin 22 is disposed between the first and second rocker arms 7 and 8, the other end of the second coupling pin 23 is positioned between the second and third rocker arms 8 and 9.

The third rocker arm 9 has a second bottomed hole 28 defined therein parallel to the rocker shaft 6 and opening toward the second rocker arm 8, the second hole 28 being the same diameter as that of the guide hole 27. The stopper pin 24 is slidably fitted in the second hole 28 with its one end abutting against the other end of the second coupling pin 23. The second hole 28 has a step 28a on its intermediate peripheral surface, the step 28a facing toward the second rocker arm 8 for receiving the other end of the stopper pin 24. When the other end of the stopper pin 24 engages the step 28a, said one end of the stopper pin 24 is positioned within the second hole 28.

The stopper pin 24 has a coaxial guide rod 29 movably inserted through a guide hole 30 defined in the closed end of the second hole 28. The return spring 25 is disposed around the guide rod 29 and interposed between the stopper pin 24 and the closed end of the second hole 28.

The first hole 26, the guide hole 27, and the second hole 28 are defined such that they are coaxial with each other when the rocker arms 7, 8 and 9 are slidably held against the base circle portions 4b, 5b and 4b of the cams 4, 5 and 4, respectively.

The rocker shaft 6 has a hydraulic pressure supply passage 31 defined axially therethrough. The first rocker arm 7 has defined therein an oil passage 33 communicating with the hydraulic pressure chamber 21 and an annular groove 34 communicating with the hydraulic passage 33 and surrounding the rocker shaft 6. The rocker shaft 6 also has an oil hole 35 through which the hydraulic pressure supply passage 31 communicates with the annular groove 34. Therefore, the hydraulic pressure supply passage 31 is held in communication with the hydraulic pressure chamber 21 at all times.

An oil supply passage 40 is connected to the outlet port of a hydraulic pressure pump 37 which draws up working oil from an oil tank 36 and has a relief valve 38 and a check valve 39 which are successively positioned downstream from the pump 37. An oil release passage 41 is connected to the oil tank 36. The hydraulic pressure supply passage 31 is connected to an oil passage 42. Between the oil supply passage 40, the oil release passage 41, and the oil passage 42, there is disposed a directional control valve 43 for switching between a high-speed position in which the oil supply passage 40 communicates with the oil passage 42 and a low-speed position in which the oil passage 42 communicates with the oil release passage 41. The directional control valve 43 is shiftable in response to energization and de-energization of a solenoid 44. When the solenoid 44 is de-energized, the oil passage 42 communicates with the oil release passage 41, as shown in FIG. 4. In response to energization of the solenoid 44, the directional control valve 43 communicates the oil passage 42 with the oil supply passage 40.

The solenoid 44 is controlled by a control unit 45 such as a computer or the like. To the control unit 45, there are electrically connected a temperature detector 46 for detecting the temperature of a coolant of the engine which is commensurate with the temperature of the working oil, and a speed detector 47 for detecting the rotational speed of the engine. Dependent on detected signals from the detectors 46 and 47, the control unit 45 selectively energizes and de-energizes the solenoid 44 and also controls a fuel supply unit 48 for supplying fuel to the engine. Additional detectors of other engine operating parameters may be used.

Figure 5:
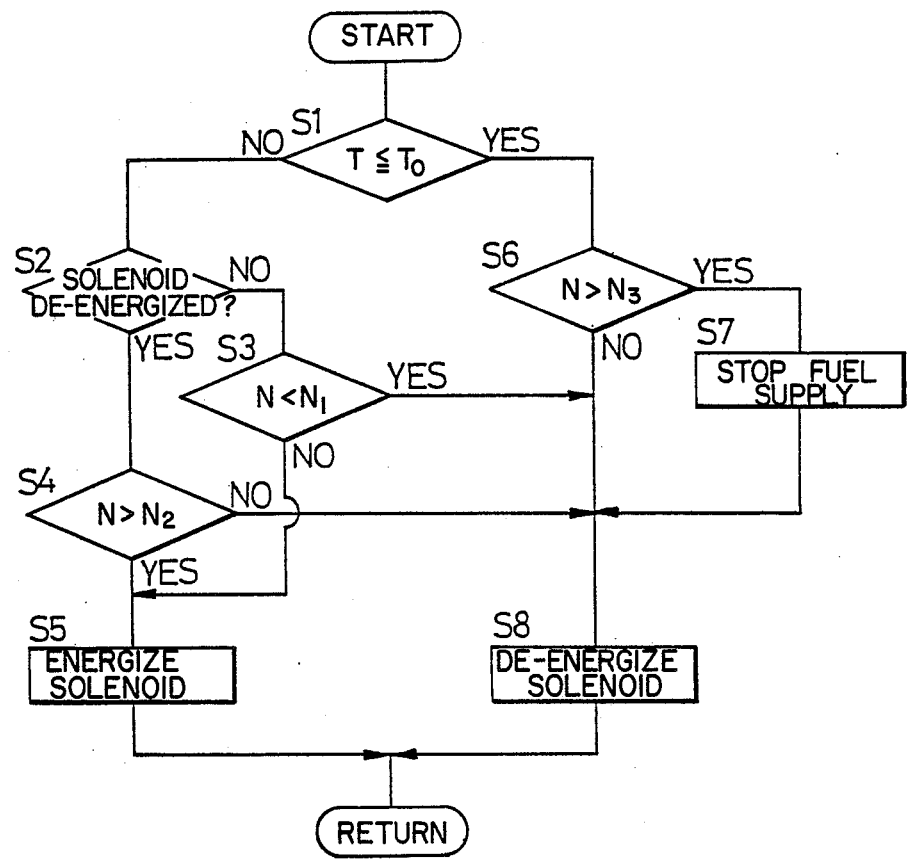
FIG. 5 is a flow chart of a control sequence of a control unit of this invention.

The control unit 45 is programmed to execute a control sequence as shown in FIG. 5. A step S1 determines whether or not a temperature T detected by the temperature detector 46 is equal to or lower than a preset temperature $T_0$ such as 50° C. If $T > T_0$, then control goes to a step S2 which determines whether the solenoid 44 is de-energized or not, i.e., if the oil passage 42 communicating with the hydraulic pressure chamber 21 of the valve operation mode changing mechanism 10 communicates with the oil release passage 41 to release hydraulic pressure from the hydraulic pressure chamber 21 or not.

If the solenoid 44 is energized, i.e., if hydraulic pressure is supplied to the hydraulic pressure chamber 21 in the step S2, then control proceeds to a step S3 which determines whether an engine speed N detected by the speed detector 47 is smaller than a first preset value $N_1$, e.g., 4,000~4,500 rpm or not. If $N \geq N_1$, then control goes to a step S5 in which the solenoid 44 is energized. If $N < N_1$, then control goes to a step S8 in which the solenoid 44 is de-energized.

If the solenoid 44 is de-energized in the step S2, then control proceeds to a step S4 which determines if $N > N_2$ $(=N_1 + \Delta N)$. If $N > N_2$, then the solenoid 44 is energized in the steps S5. If $N \leq N_2$, then the solenoid 44 is de-energized in the step S8.

Figure 6:
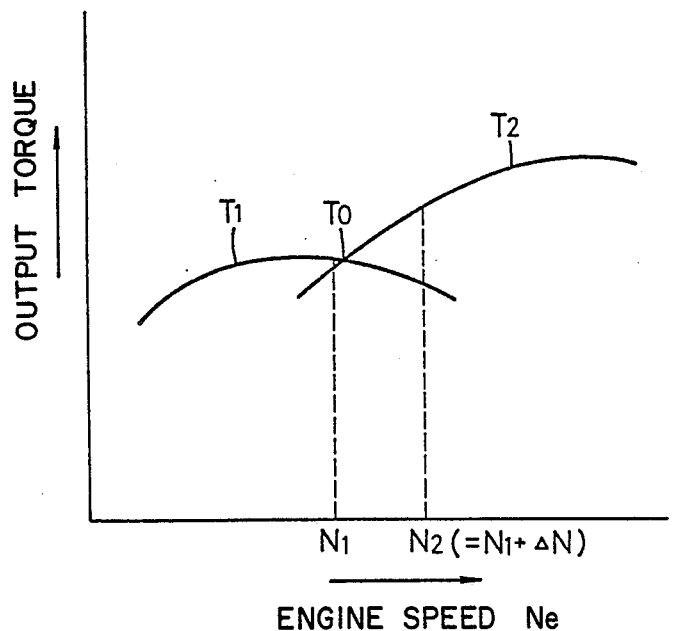
FIG. 6 is a graph of the relationship between output torque and rotational speed of the internal combustion engine in two different modes of operation of the valves.

As shown in FIG. 6, the first rotational speed $N_1$ is selected to be substantially equal to the rotational speed at which an output torque curve $T_1$ of the engine at the time the valve operation mode changing mechanism 10 is in a low-speed operation mode and an output torque curve $T_2$ of the engine at the time the valve operation mode changing mechanism 10 is in a high-speed operation mode intersect with each other, i.e., the output torques in the low- and high-speed operation modes are the same as each other. The second rotational speed $N_2$ is selected to be higher than the first rotational speed $N_1$ by $\Delta N$, i.e., to be a rotational speed at which the output torque of the engine is higher, by 3~7%, for example, than an output torque $T_0$ at which the output torques in the low- and high-speed operation modes are the same as each other. The control unit 45 determines the rotational speed N from the first rotational speed $N_1$ when it de-energizes the solenoid 44, and determines the rotational speed N from the second rotational speed $N_2$ when it energizes the solenoid 44.

If $T \leq T_0$ in the step S1, then control goes to a step S6 to determine whether the speed N is higher than a third preset value $N_3$, e.g., 6,000 rpm, or not. The second preset value $N_3$ is greater than the first preset value $N_1$ and smaller than a fourth preset value (e.g., in the range of from 7,000 to 8,000 rpm) for limiting the normal maximum engine speed. If $N > N_3$, then a signal to stop the supply of fuel is applied to the fuel supply unit 48 in a step S7. If $N \leq N_3$, then the solenoid 44 is deenergized in a step S8.

Operation of the valve operation control device of the embodiment will be described below. When the solenoid 44 is deenergized by the control unit 50, the oil passage 42 communicates with the release passage 41 to release hydraulic pressure from the hydraulic pressure chamber 21. Therefore, the mutually abutting surfaces of the first and second coupling pins 22 and 23 are positioned between the first and second rocker arms 7 and 8, and the mutually abutting surfaces of the second coupling pin 23 and the stopper pin 24 are positioned between the second and third rocker arms 8 and 9, so that the rocker arms 7 through 9 are not connected to each other. Consequently, the intake valves 1 are opened and closed by the first and third rocker arms 7 and 9 which are angularly moved by the low-speed cams 4, at the timing and lift according to the profile of the low-speed cams 4.

When the solenoid 44 is energized by the control unit 44, the directional control valve 43 is shifted to bring the oil supply passage 40 into communication with the oil passage 42 to supply hydraulic pressure to the hydraulic pressure chamber 21. The first coupling pin 22, the second coupling pin 23, and the stopper pin 24 are displaced against the resiliency of the return spring 25 until the first coupling pin 22 is fitted into the guide hole 2 and the second coupling pin 23 is fitted into the second hole 28. Therefore, the rocker arms 7, 8 and 9 are coupled to each other. Since the first and third rocker arms 7 and 9 are caused to swing with the second rocker arm 8 which is angularly moved by the high-speed cam 5, the intake valves 1 are opened and closed at the timing and lift according to the profile of the high-speed cam 5.

When the internal combustion engine is at a low temperature at which the viscosity of the working oil is high, i.e., when the temperature detected by the temperature detector 46 is equal to or lower than the preset temperature, the solenoid 44 remains deenergized. Therefore, the valve operation mode changing mechanism 10 is prevented from an operation failure which would otherwise be caused by the high viscosity of the working oil. Moreover, the supply of fuel is stopped when the rotational speed of the engine exceeds the second preset value, e.g., 6,000 rpm. Consequently, the various problems can be avoided such as a jump of the intake valves 1 due to an excessive increase in the engine speed while the intake values 1 are in the low-speed operation mode, and an excessively rich air-fuel mixture or an excessively retarded ignition spark where the valve operation control device is incorporated in an engine having an electronic fuel injection device of the intake vacuum/engine speed type and a spark advancer.

The valve operation mode changing mechanism 10 is shifted from the low-speed operation mode to the high-speed operation mode when the rotational speed N of the engine exceeds the second rotational speed $N_2$. Since the output torque of the engine at the second rotational speed $N_2$ is higher, by 3~7%, for example, than the output torque $T_0$ which remains the same in the low- and high-speed operation modes, acceleration performance can be increased while minimizing any shock upon switching over between the operation modes. The valve operation mode changing mechanism 10 is shifted from the high-speed operation mode to the low-speed operation mode when the rotational speed N of the engine drops to the first rotational speed $N_1$ at which the output torque remains substantially the same in the low- and high-speed operation modes. Thus, smooth switching over from the high-speed operation mode to the low-speed operation mode can be achieved without involving an abrupt change in the engine output torque, so that motor vehicle drivability can be improved.

Other signals such as a signal indicating an intake pipe vacuum, a signal indicating a throttle valve opening, a clutch signal, and the like may also be applied to the control unit for controlling operation of the valves.

While the present invention has been described as being applied to intake valves, the invention is also applicable to a valve operating device for exhaust valves. The present invention is also applicable to a valve operating device in which valves are partly held at rest or disabled when in a low-speed operation mode.

The invention claimed is:

1. A valve operation control device for an internal combustion engine having a valve operation mode changing mechanism for switching the opening/closing operation of an intake or exhaust valve between a low-speed operation mode corresponding to a low-speed operation of the engine and a high-speed operation mode corresponding to a high-speed operation of the engine, and control means for controlling the operation of the valve operation mode changing mechanism according to the rotational speed of the engine, comprising, a rotational speed detector for detecting the rotational speed of the engine connected to said control means, said control means having a first rotational speed setting that is substantially equal to a rotational speed at which the output torque of the engine remains the same in the low- and high-speed operation modes of the valve operation mode changing mechanism for said control means to cause shifting of the valve operation mode changing mechanism from the high-speed operation mode to the low-speed operation mode, and said control means having a second rotational speed setting higher than the first rotational speed for causing of the valve operation mode changing mechanism from the low-speed operation mode to the high-speed operation mode.

2. The valve control device of claim 1 wherein said second rotational speed is approximately 3 to 7% higher than said first rotational speed.

3. The valve control device of claim 1 wherein means are provided for detecting a temperature representative of engine operating temperature and preventing operation of the valve operation mode changing mechanism in the high-speed mode when said temperature is less than a predetermined temperature.

4. The valve control device of claim 1 wherein means are provided for preventing operation of the valve operation mode changing mechanism in the high-speed mode when the rotational speed exceeds a predetermined speed.

5. The valve control device of claim 3 wherein means are provided for preventing operation of the valve operation mode changing mechanism in the high-speed mode when the rotational speed exceeds a predetermined speed.

* * * * *